United States Patent
Moon et al.

(10) Patent No.: US 8,279,962 B2
(45) Date of Patent: Oct. 2, 2012

(54) METHOD AND APPARATUS FOR ALLOCATING FEEDBACK CHANNEL IN MULTIPLE ANTENNA COMMUNICATION SYSTEM

(75) Inventors: June Moon, Seoul (KR); Keun-Chul Hwang, Seongnam-si (KR); Sung-Woo Park, Suwon-si (KR); Soon-Young Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 908 days.

(21) Appl. No.: 12/357,900

(22) Filed: Jan. 22, 2009

(65) Prior Publication Data

US 2009/0190687 A1    Jul. 30, 2009

(30) Foreign Application Priority Data

Jan. 25, 2008    (KR) .................. 10-2008-0007796

(51) Int. Cl.
*H04B 7/02*    (2006.01)
(52) U.S. Cl. ...................................... 375/267
(58) Field of Classification Search ............ 375/267, 375/295, 316, 324
See application file for complete search history.

(56) References Cited

U.S. PATENT DOCUMENTS

| | | | | |
|---|---|---|---|---|
| 7,440,437 | B2* | 10/2008 | Song | 370/343 |
| 7,457,588 | B2* | 11/2008 | Love et al. | 455/67.11 |
| 7,577,209 | B2* | 8/2009 | Poon | 375/267 |
| 7,986,972 | B2* | 7/2011 | Kim et al. | 455/562.1 |
| 2005/0254457 | A1* | 11/2005 | Jung et al. | 370/328 |
| 2006/0111129 | A1* | 5/2006 | Ihm et al. | 455/466 |
| 2008/0069031 | A1* | 3/2008 | Zhang et al. | 370/328 |
| 2009/0023467 | A1* | 1/2009 | Huang et al. | 455/522 |

FOREIGN PATENT DOCUMENTS

| | | |
|---|---|---|
| KR | 10-2006-0019676 A | 3/2006 |
| KR | 10-2006-0033957 A | 4/2006 |
| WO | 2006/043773 A2 | 4/2006 |

* cited by examiner

*Primary Examiner* — Jaison Joseph
(74) *Attorney, Agent, or Firm* — Jefferson IP Law, LLP (57) ABSTRACT

A method and apparatus for allocating a feedback channel in a multiple antenna communication system are provided. In a method of operating a Base Station (BS) for allocating a feedback channel in a Multi-User Multiple-Input Multiple-Output (MU-MIMO) communication system, the method includes measuring a MIMO transmission environment, determining an amount of feedback according to the MIMO transmission environment, and allocating a feedback channel according to an amount of the feedback.

19 Claims, 6 Drawing Sheets

METHOD AND APPARATUS FOR ALLOCATING FEEDBACK CHANNEL IN MULTIPLE ANTENNA COMMUNICATION SYSTEM

PRIORITY

This application claims the benefit under 35 U.S.C. §119(a) of a Korean patent application filed in the Korean Intellectual Property Office on Jan. 25, 2008 and assigned Serial No. 10-2008-0007796, the entire disclosure of which is hereby incorporated by reference.

BACKGROUND OF THE INVENTION

1. Field of the Invention

The present invention relates to a multiple antenna communication system. More particularly, the present invention relates to a method and apparatus for feeding back channel information.

2. Description of the Related Art

Research is being conducted on a Multiple-Input Multiple-Output (MIMO) scheme. In comparison with a system using a single antenna, a system using multiple antennas in both transmitting and receiving ends may increase channel transmission capacity in proportion to a number of antennas without additionally allocated frequencies or Transmit (Tx) power.

The MIMO scheme may include a Single-User MIMO (SU-MIMO) scheme and a Multi-User MIMO (MU-MIMO) scheme. The SU-MIMO scheme is a point-to-point MIMO scheme in which communication is performed by concurrently allocating the same radio resources (e.g., time, frequency, etc.) to a single user. The MU-MIMO scheme is a point-to-multipoint MIMO scheme in which communication is performed by concurrently allocating the same radio resources to several users. Space-Time Transmit Diversity (STTD) and Spatial Multiplexing (SM) are examples of the SU-MIMO scheme on which many studies have been conducted up to now. Per-User Unitary Rate Control (PU2RC), Space Division Multiple Access (SDMA), and Dirty-Paper Coding (DPC) are examples of the MU-MIMO scheme which are researched.

The MIMO scheme may also include an Open-Loop MIMO (OL-MIMO) scheme and a Closed-Loop MIMO (CL-MIMO) scheme according to whether a Base Station (BS) uses feedback to know channel information. Both of the OL-MIMO and CL-MIMO schemes may be used in the SU-MIMO scheme. However, only the CL-MIMO scheme may be used in the MU-MIMO scheme since the BS may be aware of the channel information. In the CL-MIMO scheme, the channel information may be reported by a Mobile Station (MS) to the BS, and an amount of feedback information generally increases in proportion to the number of antennas.

As described above, the BS is generally aware of the channel information through feedback in the MU-MIMO scheme. In this case, two methods are used. In a first method, a channel coefficient is fed back after being quantized (e.g., in a case of Frequency Division Duplex (FDD)) or the BS estimates a channel by using a sounding signal in uplink (e.g., in a case of Time Division Duplex (TDD)). In the first method, the BS may use information on the channel, and thus there is an advantage in that a more correct and sophisticated MU-MIMO scheme may be used. However, the first method has a disadvantage in that a feedback overhead is large. In a second method, a predefined codebook is used. The MS selects a preceding matrix from the predefined codebook and feeds back only an index of the preceding matrix, thereby decreasing a feedback amount. In this case, an index of the codebook is Channel Direction Information (CDI) that indicates only a directivity of a channel. Therefore, there is a need to additionally feed back Channel Quality Information (CQI) such as a Signal to Interference and Noise Ratio (SINR).

In the MU-MIMO scheme, the PU2RC scheme is a conventional unitary preceding scheme. Information to be fed back in the PU2RC scheme is a preceding matrix, information on a data stream, and information on an SINR at that time. A method of feeding back the information may be selected variously. An optimization method is a method in which an SINR is fed back for all preceding matrixes included in a codebook and for all layers (i.e., a data stream transmitted from a Tx antenna) and thereafter a BS compares several possible combinations to determine information to be fed back. However, this method is difficult to implement due to a large amount of feedback. As a way of reducing the amount of feedback, there is a method of feeding back a Post Detection (PD)-Carrier to Interference and Noise Ratio (CINR) by selecting an index of a preceding matrix and a layer index included in the preceding matrix. However, the method of selecting and feeding back the index of the preceding matrix and the index of the layer index included in the preceding matrix has a limit in increasing a Quality of Service (QoS) of the MS, and system capacity may deteriorate due to limited channel information when a small number of MSs are used.

Accordingly, in the conventional case, transmission requirements are difficult to be satisfied when the same feedback method is used in various MIMO transmission environments.

SUMMARY OF THE INVENTION

An aspect of the present invention is to address at least the above-mentioned problems and/or disadvantages and to provide at least the advantages described below. Accordingly, an aspect of the present invention is to provide a method and apparatus for determining an amount of feedback information required according to a transmission environment in a Multi-User Multiple-Input Multiple-Output (MU-MIMO) communication system.

In accordance with an aspect of the present invention, a method of operating a Base Station (BS) for allocating a feedback channel in a MU-MIMO communication system is provided. The method includes measuring a MIMO transmission environment, determining a feedback amount according to the MIMO transmission environment, and allocating a feedback channel according to an amount of feedback.

In accordance with another aspect of the present invention, a method of operating a BS for allocating a feedback channel in a MU-MIMO communication system is provided. The method includes measuring the number of Mobile Stations (MSs), and if the number of MSs is greater than a preset threshold, allocating a feedback channel for a single data stream.

In accordance with another aspect of the present invention, a method of operating a BS for allocating a feedback channel in a MU-MIMO communication system is provided. The method includes measuring a Quality of Service (QoS) of an MS, and if the QoS of the MS is greater than a preset threshold, allocating a feedback channel for a single data stream.

In accordance with another aspect of the present invention, a method of operating a BS for allocating a feedback channel in a MU-MIMO communication system is provided. The method includes measuring an interference environment (i.e., an interference level), and if the interference level is greater than a present threshold, allocating a feedback channel for a single data stream.

In accordance with another aspect of the present invention, a method of operating an MS for allocating a feedback channel in a MU-MIMO communication system is provided. The method includes allocating a feedback channel by a BS, and feeding back channel information depending on a MIMO transmission environment through the allocated feedback channel.

In accordance with another aspect of the present invention, a BS apparatus for allocating a feedback channel in a MU-MIMO communication system is provided. The apparatus includes a transmission environment measuring unit for measuring a MIMO transmission environment, a feedback determining unit for determining a feedback amount according to the MIMO transmission environment, and a feedback channel allocating unit for allocating the feedback channel according to the feedback amount.

In accordance with another aspect of the present invention, a BS apparatus for allocating a feedback channel in a MU-MIMO communication system is provided. The apparatus includes a transmission environment measuring unit for measuring the number of MSs, and a feedback channel allocating unit for allocating a feedback channel for a single data stream if the number of MSs is greater than a preset threshold.

In accordance with another aspect of the present invention, a BS apparatus for allocating a feedback channel in a MU-MIMO communication system is provided. The apparatus includes a transmission environment measuring unit for measuring a QoS of an MS, and a feedback channel allocating unit for allocating a feedback channel for a single data stream if the QoS of the MS is greater than a preset threshold.

In accordance with another aspect of the present invention, a BS apparatus for allocating a feedback channel in a MU-MIMO communication system is provided. The apparatus includes a transmission environment measuring unit for measuring an interference environment (i.e., an interference level), and a feedback channel allocating unit for allocating the feedback channel for a single data stream if the interference level is greater than a present threshold.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein may be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, a method and apparatus for determining an amount of feedback information needed according to a transmission environment in a Multi-User Multiple-Input Multiple-Output (MU-MIMO) communication system will be described.

Figure 1:
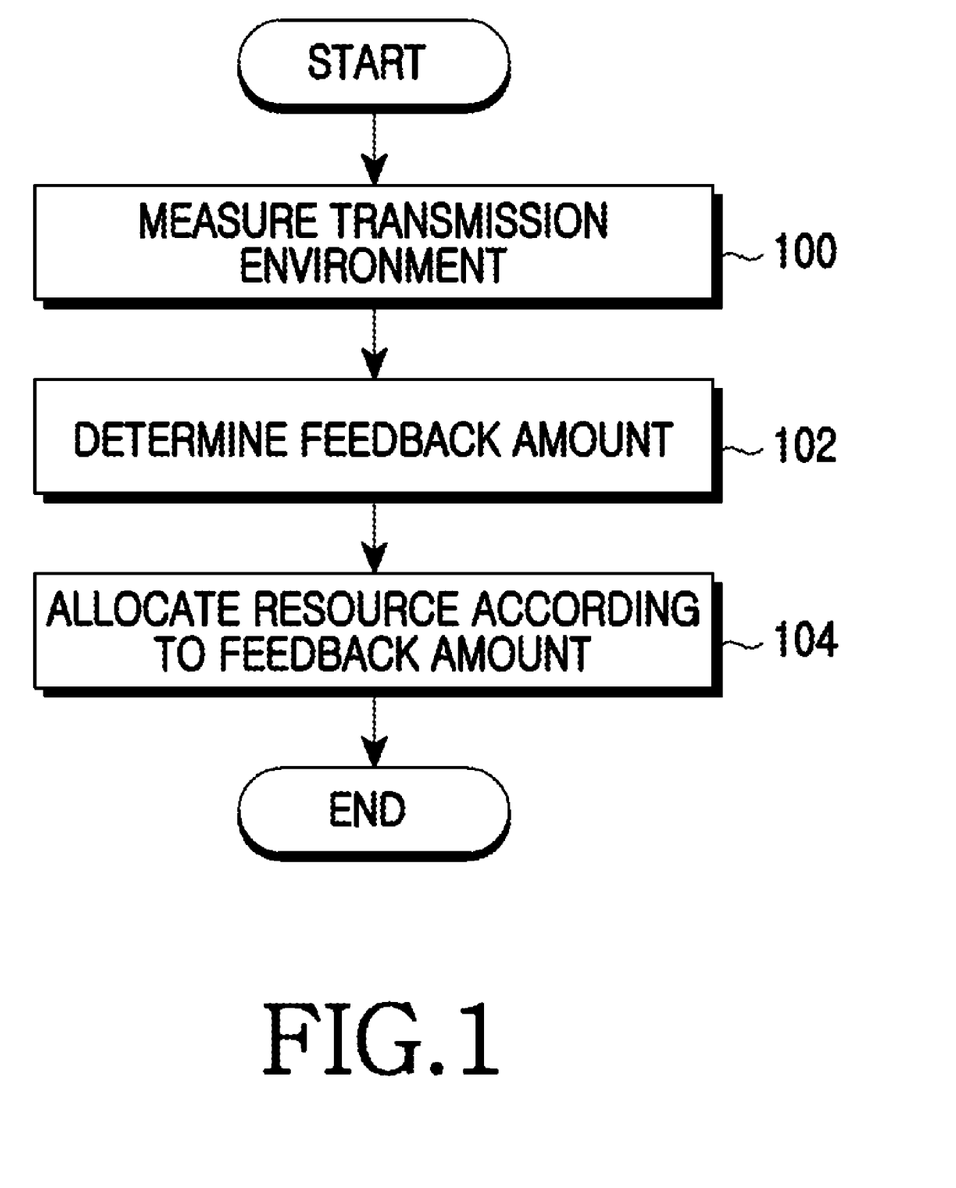
FIG. 1 is a flowchart illustrating a feedback process of a Base Station (BS) in a Multi-User Multiple-Input Multiple-Output (MU-MIMO) communication system according to an exemplary embodiment of the present invention.

FIG. 1 is a flowchart illustrating a feedback process of a Base Station (BS) in a MU-MIMO communication system according to an exemplary embodiment of the present invention.

Referring to FIG. 1, the BS measures or determines a transmission environment in step 100. The transmission environment may be determined according to a number of Mobile Stations (MSs), a Quality of Service (QoS, e.g., a transfer rate required by each MS), an interference level (or a noise level), etc.

In step 102, the BS determines a feedback amount for each MS according to the transmission environment. For example, in a case of using Per-User Unitary Rate Control (PU2RC), if a number of users is small, N-layer feedback may be used, and if the number of users is large, a single-layer feedback is sufficient (see FIG. 2A below). In addition, a feedback amount needs to be regulated so that N layers (or a single layer) are allocated to the MS according to QoS requirements of the MS (see FIG. 2B below). When the MS has two or more Receive (Rx) antennas, there is an advantage in that a Coordinated Beam Forming (CBF) shows an optimized performance in a noise-limited environment. However, the CBF performance is similar to a Zero Forcing (ZF) performance in an interference-limited environment. Therefore, a ZF scheme requiring a smaller amount of feedback is advantageous in the interference-limited environment (see FIG. 2C below).

In step 104, the BS allocates a resource corresponding to the determined feedback amount.

Thereafter, the procedure of FIG. 1 ends.

Figure 2A:
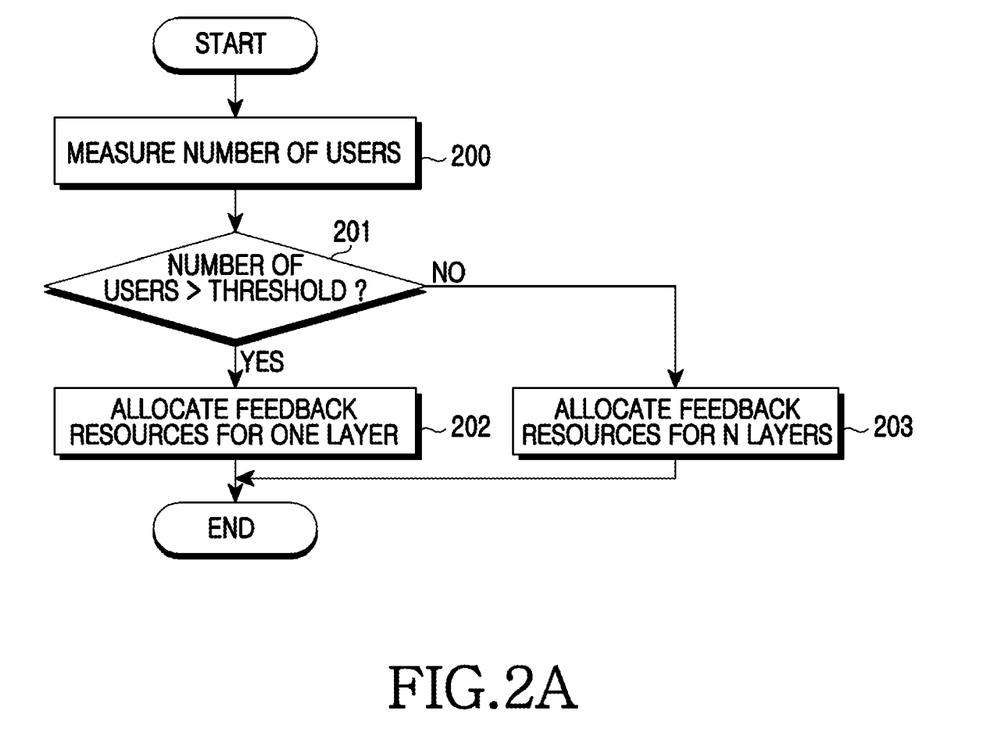
FIG. 2A is a flowchart illustrating a process of determining a feedback amount depending on the number of users according to an exemplary embodiment of the present invention.

FIG. 2A is a flowchart illustrating a process of determining a feedback amount depending on the number of users according to an exemplary embodiment of the present invention.

Referring to FIG. 2A, a BS measures a number of MSs which attempt a network access in step 200.

The BS determines if the number of MSs is greater than a preset threshold in step 201. If the number of MSs is greater than the preset threshold, the BS allocates feedback resources for a single layer in step 202. That is, the BS allocates the resources to feed back an index of a preceding matrix and a corresponding layer index.

In contrast, if the number of MSs is less than the preset threshold in step 201, the BS allocates feedback resources for N layers in step 203. That is, the BS allocates the resources to feed back the index of the precoding matrix and corresponding N layer indices.

Thereafter, the procedure of FIG. 2A ends.

Figure 2B:
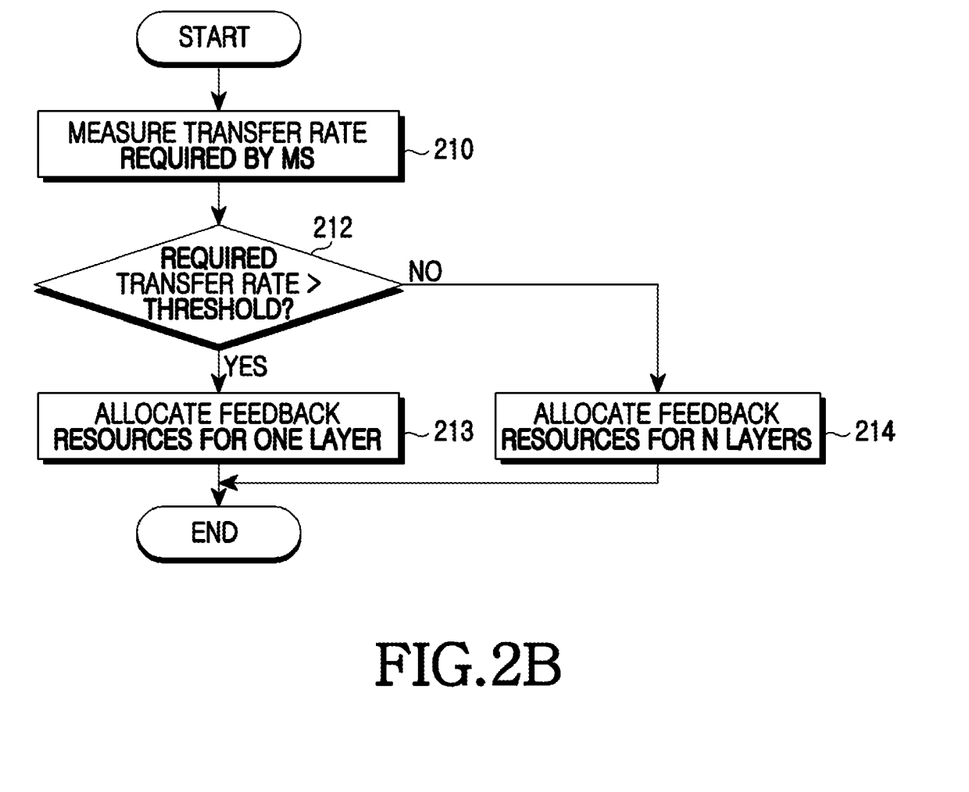
FIG. 2B is a flowchart illustrating a process of determining a feedback amount depending on a transfer rate required by a Mobile Station (MS) according to an exemplary embodiment of the present invention.

FIG. 2B is a flowchart illustrating a process of determining a feedback amount depending on a transfer rate required by an MS according to an exemplary embodiment of the present invention.

Referring to FIG. 2B, a BS measures the transfer rate required by the MS in step 210.

The BS determines if the transfer rate required by the MS is greater than a preset threshold in step 212. If the transfer rate required by the MS is greater than the preset threshold, the BS allocates feedback resources for a single layer in step 213. That is, the BS allocates the resources to feed back an index of a precoding matrix and a corresponding layer index.

In contrast, if the number of MSs is less than the preset threshold in step 212, the BS allocates feedback resources for N layers in step 214. That is, the BS allocates the resources to feed back the index of the preceding matrix and corresponding N layer indices.

Thereafter, the procedure of FIG. 2B ends.

As described above with reference to FIGS. 2A and 2B, cell capacity may be limited due to limited channel information. When a number of users is large, deterioration of system capacity may be minimized by performing MU-MIMO scheduling. However, there is a limit in increasing a QoS of the MS from the perspective of the MS since only a single layer may be allocated by feeding back only a Signal to Interference and Noise Ratio (SINR) for a single layer. In addition, when the number of MSs is small, deterioration of system capacity may increase due to limited channel information of the BS. In this case, performance deterioration may be prevented by increasing a feedback amount (e.g., N-layer feedback) of the MS. For example, if Post Detection (PD)-SINR information for two layers is fed back in a precoding matrix selected by each MS in a 2×2 MIMO system environment, feedback information for each MS increases two times higher than a case of feeding back PD-SINR information for a single layer. However, since two layers may be allocated to a single MS (i.e., allocation in a single user mode), a QoS of the MS may be increased. In addition, if the number of users is small and thus capacity may not be expected to be increased due to a small multi-user diversity gain, a capacity gain may be obtained by using a Maximum Likelihood (ML) scheme or a Successive Interference Cancellation (SIC) scheme.

Figure 2C:
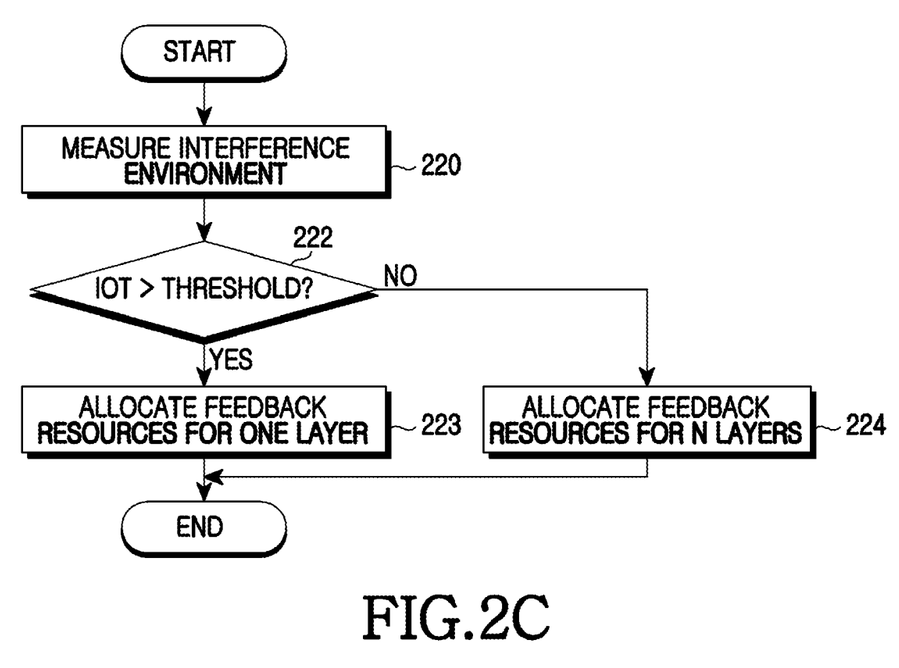
FIG. 2C is a flowchart illustrating a process of determining a feedback amount depending on an interference environment according to an exemplary embodiment of the present invention.

FIG. 2C is a flowchart illustrating a process of determining a feedback amount depending on an interference environment according to an exemplary embodiment of the present invention.

Referring to FIG. 2C, a BS measures an Interference Over Thermal (IOT) in step 220. Herein, the greater the IOT, the greater the interference.

The BS determines if the IOT is greater than a preset threshold in step 222. If the IOT is greater than the preset threshold, the BS allocates feedback resources for a single layer in step 223. That is, the BS allocates a vector codebook.

In contrast, if the IOT is less than the preset threshold in step 222, the BS allocates feedback resources for N layers in step 224. That is, the BS allocates a matrix codebook.

Thereafter, the procedure of FIG. 2C ends.

As described above with reference to FIG. 2C, unlike in the PU2RC in which a BS uses a codebook matrix fed back by an MS as a beam weight, in a Zero Forcing-Space Division Multiple Access (ZF-SDMA) scheme of the MU-MIMO scheme, the BS generates the beam weight through additional processing and transmits the generated beam weight to the MS, resulting in performance improvement in comparison with the PU2RC. When the BS has four antennas and the MS has a single Rx antenna, each MS selects a codebook for a 4×1 channel vector and feeds back the selected codebook to the BS. Then, the BS estimates a channel vector from an index of the codebook fed back by each MS and thereafter performs a MU-MIMO operation by generating and transmitting beams orthogonal to all of the four MSs. When the MS has two Rx antennas, the beams orthogonal to all of the four MSs may not be generated by performing a simple ZF operation. Thus, the MS may feed back a codebook for an Rx antenna having a better channel environment between the two Rx antennas and then the BS may allocate four users by performing the same operation as in the case where the MS uses a single Rx antenna. However, since the beam weight has not been generated by considering both of the two Rx antennas of the MS, a quasi-optimized operation is performed. In this case, performance may be optimized since the orthogonal beams may be generated by simultaneously optimizing a beam weight of the BS and a beam weight received by the MS according to a CBF scheme. A feedback amount required by the CBF scheme is two times higher than that of the ZF scheme since a matrix codebook for a 4×2 channel has to be fed back in the CBF scheme.

Figure 3:
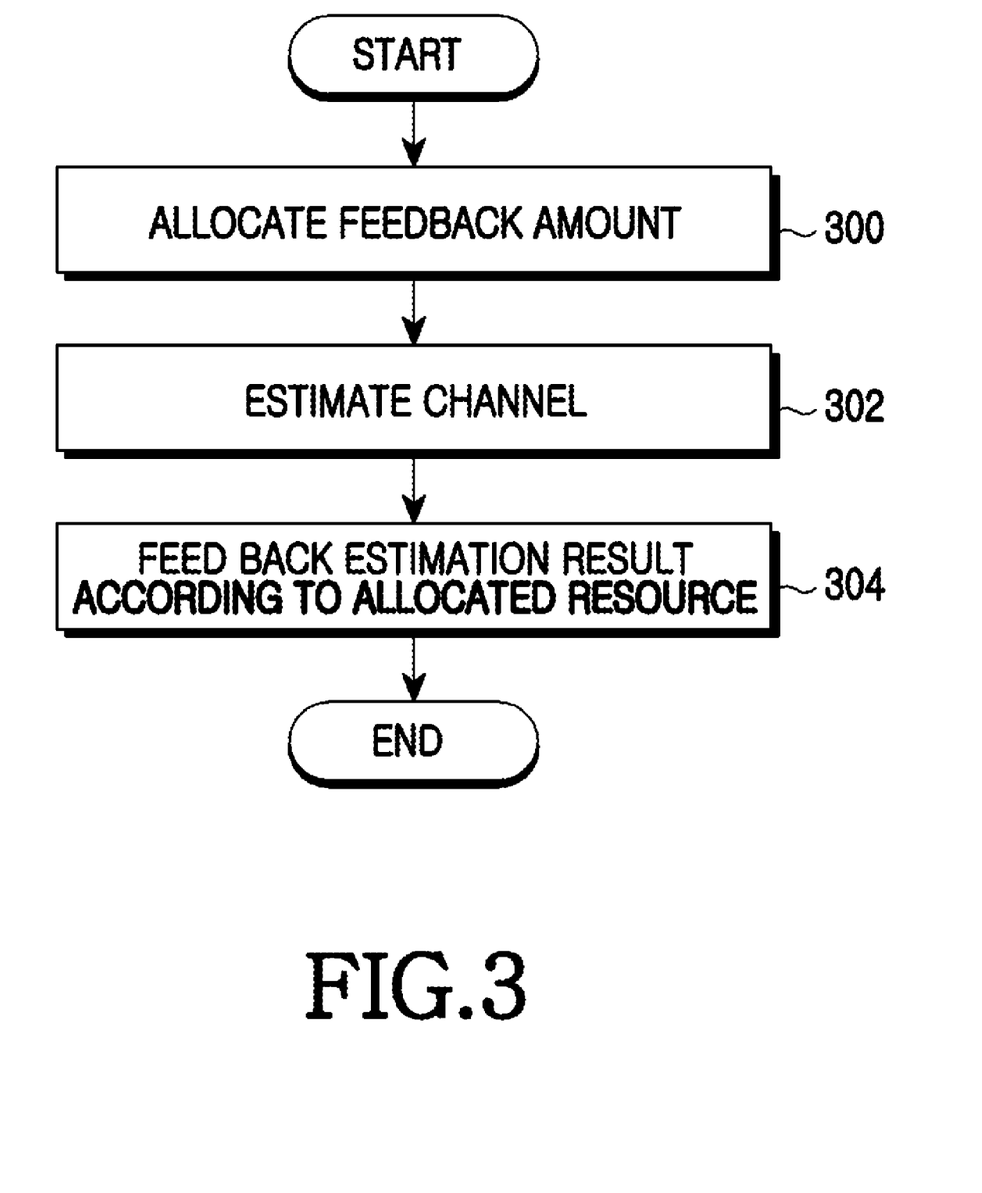
FIG. 3 is a flowchart illustrating a feedback process of an MS in a MU-MIMO communication system according to an exemplary embodiment of the present invention.

FIG. 3 is a flowchart illustrating a feedback process of an MS in a MU-MIMO communication system according to an exemplary embodiment of the present invention.

Referring to FIG. 3, the MS receives a feedback resource allocated by a BS in step 300.

The MS performs channel estimation for all layers in step 302, and feeds back a channel estimation result according to the allocated resource in step 304. Table 1 below shows an example of a feedback channel configuration of PU2RC.

TABLE 1

| feedback format (binary) | feedback content | length (bits) | description |
|---|---|---|---|
| 0010 * MU-MIMO support | Encoded Band Bitmap | 8 bits | Encoded Band bitmap for 6-band or 12-band based reporting ($_{12}C_3 + _6C_3 = 240$) |
| | For (i=0; i<3; i++) { | | |
| | MU-CQI | 5 bits | MU-CQI value |
| | Column index (m) | 1 bits | column index of matrix |
| | Codebook index (g) | 2 bits | codebook index |
| | } | | |
| 0011 * additional information for dynamic operation of MU/SU MIMO | For (i=0; i<3; i++) { | | |
| | Rank | 1 bits | rank information |
| | SU-CQI | 5 bits | additional CQI for SU operation |
| | } | | |

Herein, if the BS determines a feedback format to be "0010" according to a transmission environment in a process of resource allocation, the MS configures feedback information by including a MU-Channel Quality Indicator (CQI) value, a column index of a corresponding matrix, and a codebook index. If the feedback format is "0011", the MS configures the feedback information by including rank information and an additional CQI for a Single User (SU). That is, the BS may change the feedback format for each MS according to the transmission environment.

Thereafter, the procedure of FIG. 3 ends.

Figure 4:
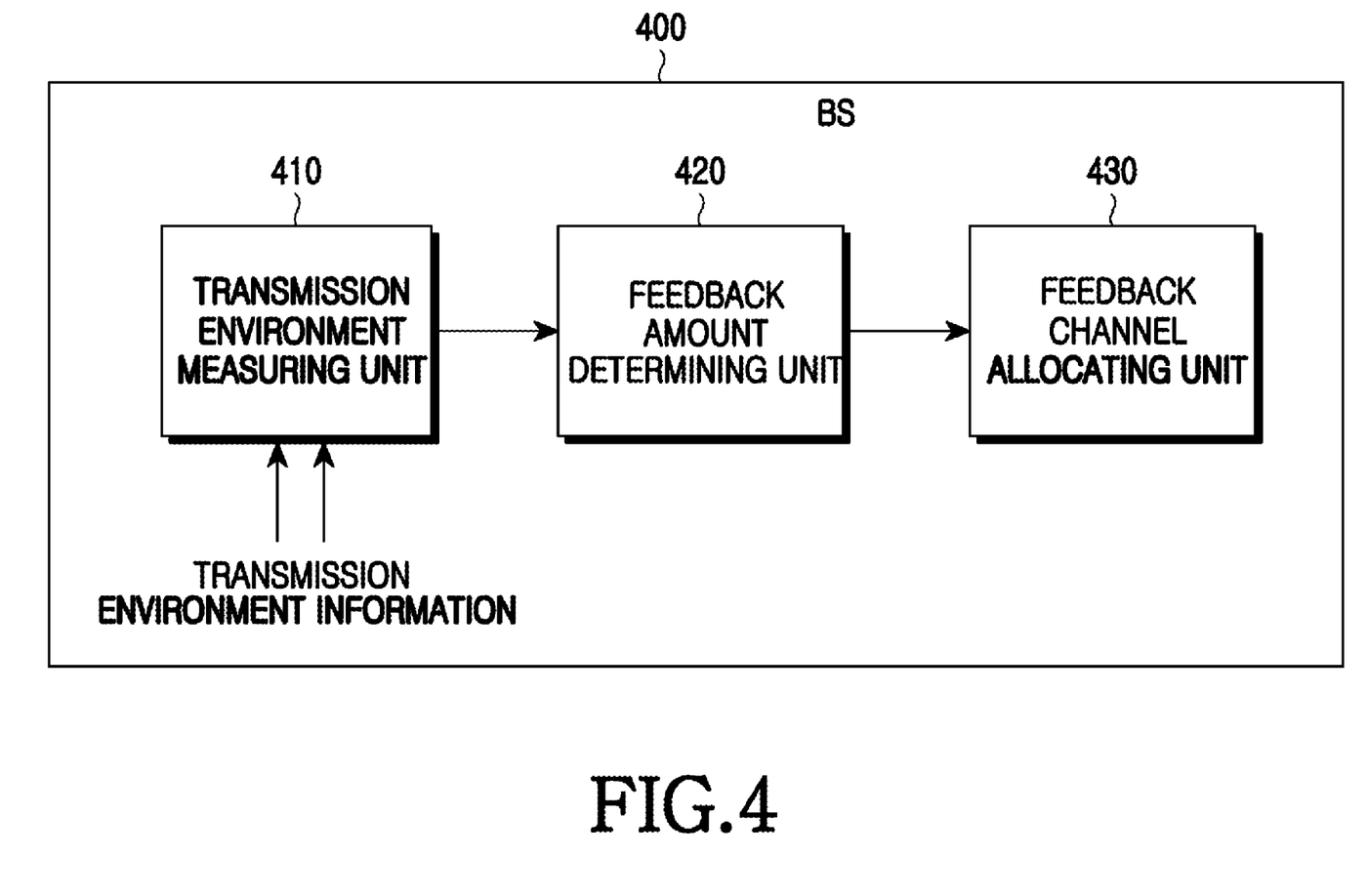
FIG. 4 is a block diagram illustrating a BS for performing a feedback process in a MU-MIMO communication system according to an exemplary embodiment of the present invention.

FIG. 4 is a block diagram illustrating a BS for performing a feedback process in a MU-MIMO communication system according to an exemplary embodiment of the present invention.

Referring to FIG. 4, a BS 400 includes a transmission environment measuring unit 410 for measuring a MIMO transmission environment, a feedback amount determining unit 420 for determining a feedback amount according to the MIMO transmission environment, and a feedback channel allocating unit 430 for allocating resources according to the feedback amount.

In an exemplary implementation, the transmission environment measuring unit 410 measures a number of MSs, and the feedback channel allocating unit 430 allocates a feedback channel for a single layer if the number of MSs is greater than a preset threshold. In contrast, if the number of MSs is less than the preset threshold, the feedback channel allocating unit 430 allocates a feedback channel for N layers.

In another exemplary implementation, the transmission environment measuring unit 410 measures a transfer rate required by an MS, and the feedback channel allocating unit 430 allocates a feedback channel for a single layer if the transfer rate required by the MS is greater than a preset threshold. In contrast, if the transfer rate required by the MS is less than the preset threshold, the feedback channel allocating unit 430 allocates a feedback channel for N layers.

In still another exemplary implementation, the transmission environment measuring unit 410 measures an interference environment (i.e., an interference level), and the feedback channel allocating unit 430 allocates a feedback channel for a single layer if the interference level is greater than a preset threshold. In contrast, if the interference level is less than the preset threshold, the feedback channel allocating unit 430 allocates a feedback channel for N layers. The measured interference level may be an Interference Over Thermal (IOT).

As described above, exemplary embodiments of the present invention provide an advantage in that system capacity may be optimized according to a transmission environment by determining a feedback amount requested by an MS according to the transmission environment in a MU-MIMO communication system.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of operating a Base Station (BS) for allocating a feedback channel in a Multi-User Multiple-Input Multiple-Output (MU-MIMO) communication system, the method comprising:
   measuring, by the BS, a MU-MIMO transmission environment;
   determining, by the BS, an amount of feedback information for each of a plurality of Mobile Stations (MSs) according to the MU-MIMO transmission environment; and
   allocating, by the BS, a feedback channel according to the amount of the feedback information,
   wherein the MU-MIMO transmission environment is measured based on at least one of a number of the MSs, a Quality of Service (QoS) of each MS, and interference.

2. A method of operating a Base Station (BS) for allocating a feedback channel in a Multi-User Multiple-Input Multiple-Output (MU-MIMO) communication system, the method comprising:
   measuring a number of Mobile Stations (MSs); and
   if the number of MSs is greater than a preset threshold, allocating a feedback channel for a single data stream.

3. The method of claim 2, wherein, if the number of MSs is less than the preset threshold, allocating the feedback channel for a plurality of data streams.

4. A method of operating a Base Station (BS) for allocating a feedback channel in a Multi-User Multiple-Input Multiple-Output (MU-MIMO) communication system, the method comprising:
   measuring a Quality of Service (QoS) of a Mobile Station (MS); and
   if the QoS of the MS is greater than a preset threshold, allocating a feedback channel for a single data stream.

5. The method of claim 4, wherein, if a transfer rate required by the MS is less than the preset threshold, allocating the feedback channel for a plurality of data streams.

6. A method of operating a Base Station (BS) for allocating a feedback channel in a Multi-User Multiple-Input Multiple-Output (MU-MIMO) communication system, the method comprising:

measuring an interference level; and
if the interference level is greater than a present threshold, allocating a feedback channel for a single data stream.

7. The method of claim 6, wherein, if the interference level is less than the preset threshold, allocating the feedback channel for a plurality of data streams.

8. The method of claim 6, wherein the measured interference level comprises an Interference Over Thermal (IOT).

9. A method of operating a Mobile Station (MS) for allocating a feedback channel in a Multi-User Multiple-Input Multiple-Output (MU-MIMO) communication system, the method comprising:
feeding back, by the MS, channel information depending on a MU-MIMO transmission environment, through a feedback channel allocated by a Base Station (BS) for the MS, according to an amount of feedback information determined by the BS for the MS.

10. The method of claim 9, further comprising configuring the feedback information.

11. The method of claim 10, wherein, the configuring of the feedback information comprises:
determining the feedback format;
if the feedback format supports MU-MIMO, transmitting, by the MS, at least one of a Channel Quality Indicator (CQI), a column index, and a codebook index; and
transmitting, by the MS, additional information for dynamically operating Single User (SU)/MU-MIMO and an additional CQI for SU.

12. A Base Station (BS) apparatus for allocating a feedback channel in a Multi-User Multiple-Input Multiple-Output (MU-MIMO) communication system, the BS apparatus comprising:
a transmission environment measuring unit for measuring a MU-MIMO transmission environment;
a feedback determining unit for determining an amount of feedback information for each of one or more Mobile Stations (MSs) according to the MU-MIMO transmission environment; and
a feedback channel allocating unit for allocating a feedback channel according to the feedback amount,
wherein the MU-MIMO transmission environment is measured based on at least one of a number of the MSs, a Quality of Service (QoS) of each MS, and interference.

13. A Base Station (BS) apparatus for allocating a feedback channel in a Multi-User Multiple-Input Multiple-Output (MU-MIMO) communication system, the apparatus comprising:
a transmission environment measuring unit for measuring a number of Mobile Stations (MSs); and
a feedback channel allocating unit for allocating a feedback channel for a single data stream if the number of MSs is greater than a preset threshold.

14. The apparatus of claim 13, wherein the feedback channel allocating unit allocates the feedback channel for a plurality of data streams if the number of MSs is less than the preset threshold.

15. A Base Station (BS) apparatus for allocating a feedback channel in a Multi-User Multiple-Input Multiple-Output (MU-MIMO) communication system, the apparatus comprising:
a transmission environment measuring unit for measuring a Quality of Service (QoS) of a Mobile Station (MS); and
a feedback channel allocating unit for allocating a feedback channel for a single data stream if the QoS of the MS is greater than a preset threshold.

16. The apparatus of claim 15, wherein the feedback channel allocating unit allocates the feedback channel for a plurality of data streams if a transfer rate required by the MS is less than the preset threshold.

17. A Base Station (BS) apparatus for allocating a feedback channel in a Multi-User Multiple-Input Multiple-Output (MU-MIMO) communication system, the apparatus comprising:
a transmission environment measuring unit for measuring an interference environment; and
a feedback channel allocating unit for allocating a feedback channel for a single data stream if the interference level is greater than a present threshold.

18. The apparatus of claim 17, wherein the feedback channel allocating unit allocates the feedback channel for a plurality of data streams if the interference level is less than the preset threshold.

19. The apparatus of claim 17, wherein the measured interference level is an Interference Over Thermal (IOT).

* * * * *